United States Patent Office 2,777,890
Patented Jan. 15, 1957

2,777,890

PROCESS OF PREPARING OILY BUTADIENE POLYMERS AND PRODUCTS THEREOF

Carol K. Ikeda, Wallingford, Pa., assignor to E. I. du Pont de Nemours and Company, Wilmington, Del., a corporation of Delaware No Drawing. Application June 15, 1953,
Serial No. 361,861

12 Claims. (Cl. 260—680)

This invention relates to new compositions of matter and methods for producing them. More particularly, it relates to new oily polymers of butadiene-1,3, processes of producing them, and coating compositions containing them.

Butadiene-1,3 has been polymerized with various catalysts including boron trifluoride, boron trifluoride etherate, boron trifluoride hydrate and mixtures thereof to produce oily polymers. However, when these polymers are air dried or baked on steel or other surfaces, they yield coatings which are limited in utility because of such deficiencies as brittleness, poor adhesion, difficulty of curing, and tendency to develop pock marks or other surface irregularities.

It is the principal object of this invention to provide oily polymers of butadiene-1,3 which are improved with respect to these deficiencies and which therefore are particularly suitable for use as film forming ingredients in coating compositions, especially coating compositions for sheet steel for wet pack food and beverage containers. It is a further object to provide a process of preparing such improved oily butadiene-1,3 polymers. It is a still further object to provide coating compositions comprising such improved polymers, and articles coated therewith.

These objects are accomplished by (1) polymerizing butadiene-1,3 at from −20° to +20° C. in the presence of boron trifluoride etherate containing from 0.1 to 1.4 mols of water per mol of boron trifluoride etherate, and (2) increasing the viscosity of the resulting polymer by treating a solution thereof in inert solvent with boron trifluoride.

In one method for preparing the oily polybutadienes of this invention, a reactor fitted with a stirrer, vent valve, and inlet tube to deliver butadiene as a gas is charged with an inert solvent, e. g. petroleum ether, and about 1% to 10%, by weight of the butadiene to be polymerized, of a boron trifluoridediethyl ether complex containing from 0.1 to 1.4 mols of water per mol of boron trifluoride etherate. The reactor is cooled to between −20° and +20° C. and is swept substantially air-free with nitrogen. Thereafter the vent valve is closed and the butadiene supply is turned on and regulated to maintain a positive pressure within the reactor. This pressure is held substantially constant at the temperature selected for reaction by introducing butadiene as needed until a predetermined amount has been added, when the inlet valve is closed. The reaction mixture is allowed to stand for from 1 to 10 hours, i. e. until the pressure in the reactor becomes substantially constant, and is then permitted to warm to room temperature; or, alternatively, the unreacted butadiene is removed by vacuum distillation as the temperature of the charge is permitted to rise. The second stage of the process is accomplished by adjusting the resulting solution in the reactor to a polymer solids content of about 20–80% and introducing boron trifluoride through the gas inlet valve while the charge is agitated and held at about −20° to +100° C. under the autogenous pressure resulting from a continuous supply of boron trifluoride gas. The reaction is considered complete when the desired degree of viscosity increase has been obtained, and it is stopped at this point by discontinuing the introduction of boron trifluoride and adding a material which inactivates the residual boron trifluoride, e. g. methanol. The thus inactivated catalyst is then removed from the composition by any convenient means, e. g. by centrifugation or solvent extraction.

The thus produced butadiene-1,3 polymer solution is useful as a clear coating composition or as a film forming ingredient in a coating composition containing other materials, such as pigments and other film formers.

The intermediate products resulting from the polymerization of butadiene-1,3 in the presence of a catalyst comprising boron trifluoride etherate and water are separately claimed in copending application Serial No. 277,727, now U. S. Patent No. 2,708,639, filed by Henry C. Miller on March 20, 1952, and assigned to the same assignee as the instant application. The products of the copending application are useful as coating compositions; and the products of the instant application are improvements thereover, particularly with respect to freedom from pock marks in thin coatings on smooth metal.

The "boron trifluoride etherate" referred to in the description of this invention is a complex of boron trifluoride and diethyl ether in substantially equimolar proportions. It is described on page 69 of the text by H. S. Booth and D. R. Martin entitled "Boron Trifluoride and Its Derivatives," John Wiley and Sons, Inc., New York (1949).

The following examples illustrate the principles and practice of this invention but are not to be considered as limitations thereof. Unless otherwise indicated, the parts and percentages are by weight.

*Example 1*

A pressure vessel, equipped with a stirrer, thermometer, vent valve, and inlet tube to deliver butadiene-1,3 as a gas above the surface of the liquid in the reactor was cooled in a thermostated bath designed to hold the reaction temperature at 0° to +5° C. The butadiene inlet tube was connected to a source of butadiene through a pressure regulator set to maintain a positive pressure of 10–20 millimeters of mercury gage within the reactor. The reactor was charged with 12 parts of petroleum naphtha and 7 parts of a mixture of 20 parts of boron trifluoride diethyl ether complex with 1 part of water, which gave a molar composition of approximately 1 mol of boron trifluoride/1 mol of diethyl ether/0.4 mol of water. The mixture was stirred vigorously to disperse the catalyst mixture in the petroleum naphtha. The air in the reactor was displaced with nitrogen and the cooling bath was adjusted until the temperature inside the reactor was between 0° and +5° C. The butadiene was then turned on and the vent valve was opened to allow the butadiene to displace the nitrogen in the reactor. The vent valve was then closed. A vigorous exothermic reaction set in as the butadiene was continually introduced, and 166 parts by weight of butadiene were absorbed in 7¾ hours. The addition of butadiene was then discontinued and the mixture was allowed to stir at 0° to +5° C. for an additional 2¾ hours. Cooling was discontinued and the temperature of the charge was permitted to rise to room temperature, about 25° C. Then 114 parts of mineral spirits were added to the charge to produce a solution containing approximately 55% polymer by weight and having a viscosity of about A (Gardner-Holdt bubble tube at 25° C.). The temperature was again reduced to about 0° C. The air in the reactor was swept out with substantially anhydrous nitrogen and the vent valve was closed. Substantially anhydrous boron trifluoride gas was then introduced below the liquid level. The introduction of boron trifluoride was continued as the gas was absorbed in the charge, while stirring at a pressure of about 1–10 inches of mercury gage and a temperature of about 0° C. The viscosity of the charge gradually increased, and when it reached a value of about K (Gardner-Holdt), the reaction was stopped by stopping the flow of boron trifluoride, quickly adding 111 parts of methanol and intimately mixing it with the charge. At this point, a total of 2.3 parts of boron trifluoride had been introduced.

The temperature was permitted to rise to room temperature, and the polymer solution was separated from the residual boron trifluoride, including the boron trifluoride etherate/water catalyst employed in the first part of the process, by permitting the charge to settle into two layers and separating them. Two additional washes with methanol, accompanied by settling and separation after each, produced a polymer solution substantially free of residual catalyst.

The methanol remaining in the polymer solution was removed by distillation under a vacuum of 13–28 inches of mercury at a temperature of 42°–96° C. The resulting polymer solution contained 60.8% polymer by weight. The viscosity of a sample adjusted to 50% polymer content by weight was about K (Gardner-Holdt).

*Example 2*

A clear coating composition was prepared by diluting 4 volumes of a 50% solution of the polymer produced in Example 1 with approximately 3 volumes of a predominantly aromatic petroleum hydrocarbon solvent. The resulting thinned solution was applied to a clean steel panel and the excess was allowed to drain off. The panel was baked for 10 minutes at 420° F. The resulting film was smooth, clear, hard, adherent, flexible and insoluble in the solvents contained in the liquid coating composition.

Such a coating, when applied to black, hot rolled, sheet metal at a coating rate of about 10–25 milligrams of dry film per 4 square inches, such as by roller coating or spraying, is suitable as a protective coating for the inside of cans used for packaging various foods.

Tin plated sheet steel coated similarly is useful in cans for packaging beer.

*Example 3*

A pigmented coating composition was prepared by grinding the following composition in a conventional pebble mill for approximately four days:

| | Parts by weight |
|---|---|
| Butadiene polymer solution | 416 |
| Aromatic petroleum hydrocarbon solvent | 10 |
| Titanium dioxide pigment | 96 |
| Zinc oxide pigment | 24 |
| Barium sulfate pigment | 280 |
| | 826 |

The butadiene polymer solution was prepared in accordance with the process of this invention and contained 47.9 parts by weight of polymer and 52.1 parts by weight of predominantly aromatic petroleum hydrocarbon solvent. It had a viscosity of J (Gardner-Holdt).

The pigmented product resulting from the above described operation was a smooth uniform dispersion of finely divided pigments in the polybutadiene solution.

The composition was used as a coating composition by mixing 5 volumes of it with approximately 1 volume of hydrocarbon solvent, spraying about a 2 mil thick wet coating on a clean steel panel and baking the panel for 20 minutes at 350° F.

The resulting coating was smooth, hard, flexible and adherent; and it protected the metal from rusting. It was particularly useful as a primer under white enamel topcoats for such articles as refrigerator and washing machine cabinets.

*Example 4*

The process of Example 1 was repeated using 500 parts of a low boiling petroleum hydrocarbon as the polymerization medium, 20 parts of the same catalyst, 400 parts of butadiene and a temperature of about +10° C. during the first part of the process in which the butadiene was polymerized in the presence of boron trifluoride etherate and water.

During the second part of the process in which the polymer is further treated with substantially anhydrous boron trifluoride gas, the solution was thinned to about 27% by weight of polymer and the reaction tempreature was maintained at about +25° C.

The resulting polymer solution was similar in properties to the product of Example 1 and was useful as a coating composition.

*Example 5*

The process of Example 1 was repeated except for maintaining the reaction temperature between −19° C. and −16.5° C. during the first part of the process in which butadiene was polymerized in the presence of boron trifluoride etherate and water.

The resulting polymer solution was similar in properties to the product of Example 1 and was useful as a coating composition.

In practicing the process of this invention, a liquid polymerization medium is employed to aid in dispersing the catalyst and in controlling the reaction temperature by dissipating the heat of reaction. Suitable media are hydrocarbons such as petroleum ether, naphtha, mineral spirits, cyclohexane, and iso-octane. The temperature of the reaction may also be controlled supplementally by operating at a pressure, e. g. sub-atmospheric, at which the butadiene in the reactor is continuously refluxing.

The reaction temperature range of −20° C. to +20° C. is critical for the first part of the process in which butadiene is polymerized in the presence of boron trifluoride etherate and water. At temperatures below −20° C., the reaction is too slow for practical purposes. The polymers produced at temperatures above +20° C. do not increase materially in viscosity during the second part of the process. The preferred temperature range is from −10° C. to +10° C.

The use of different catalysts in the two distinct parts of the process is critical. It has been found that suitable products for the purpose of this invention are not produced by using boron trifluoride etherate and water as the sole catalyst because only relatively low viscosity products are produced and because films of such products tend to develop pock marks or surface irregularities which limit their utility as coating compositions. Products made by using boron trifluoride as the sole catalyst are curd-like and insoluble and are therefore unsuitable for coating compositions.

Similarly the proportion of water with respect to boron trifluoride etherate employed in the first part of the process is critical. It has been determined that less than 0.1 mol or more than 1.4 mols of water per mol of boron trifluoride etherate yield substantially no polymerization of the butadiene. The preferred proportion is 0.2 to 1.0 mol of water per mol of boron trifluoride etherate.

The amount of boron trifluoride etherate/water catalyst in relation to the amount of butadiene to be polymerized is important as a means of effecting the polymerization of the butadiene and of conducting the reaction in a minimum of time and should be between about 1% and about 10% by weight, based on the weight of the butadiene charged into the reactor. For purposes of efficiency and economy, it is preferred to use about 2% to 5%.

With respect to the second part of the process in which the polymer is further treated with boron trifluoride gas, the reaction is most efficiently effected by treating a solution containing 20-80% of polymer by weight in an inert solvent, i. e. one which does not readily enter into chemical combination with the reagents under the prescribed operating conditions to produce an objectionable side-reaction product. Below about 20% the production capacity of the reactor is low because the reaction proceeds more slowly and the high proportion of inert solvent occupies otherwise usable spaced in the reactor. Also, for most uses the products require subsequent concentration to a higher solids content. Above about 80% the reaction medium is sufficiently viscous to make the operating temperature and the end point of the reaction difficult to control.

The second part of the process may be conducted over a wide range of temperatures, e. g. −20° C. to +100° C. At temperatures below about −20° C., the process is relatively uneconomical because of the added cost of cooling without compensatory advantages in product quality. At temperatures above about +100° C., considerable pressure is required to cause the boron trifluoride to enter and remain in the solution, and additional facilities for heating and cooling are required. The preferred reaction temperature for the second part of the process in which the polymer is treated with boron trifluoride gas is between +10° and +50° C.

The amount of boron trifluoride gas used as the catalyst in the second part of the process is important, in relation to the amount of polymer being treated, as a means of effecting an increase in viscosity of the polymer, of conducting the reaction in a minimum of time, and of controlling the degree to which the viscosity has increased at the end point of the treatment. A minute amount of boron trifluoride gas produces a minute viscosity increase; conversely an excessively large amount produces gelled or insoluble materials. The preferred amount of boron trifluoride gas in the second part of the process is between 0.25% and 3% by weight based on the weight of the polymer being treated.

Both parts of the process are most conveniently operated under the autogenous pressure of the gaseous ingredients employed, although either or both parts can be operated under higher or lower pressures by the application of external forces.

In the foregoing discussion it is indicated that the boron trifluoride etherate/water catalyst used to polymerize the butadiene in the first part of the process is left in the reaction mixture during the second part of the process. If desired, this catalyst may be removed before the second part is begun by extracting with solvents, such as methanol, or by precipitation with an insolubilizing agent, such as ammonia, followed by filtration or centrifugation.

The foregoing discussion discloses the inactivation and removal of the boron trifluoride employed in the second part of the process by treatment with methanol. Other methods of removing the boron trifluoride include treatment with alcohols other than methanol, ethers, aldehydes, ketones, organic acids, amines, ammonia, water, metallic salts or metallic oxides, followed by extraction, filtration or centrifugation. When an organic liquid such as methanol is used, some of it remains in the solution after removal of the catalyst. Useful coating compositions can be prepared without further treatment to remove this residual amount. However it is preferred to treat the product, e. g. by vacuum distillation, to remove the remaining extraction agent.

The butadiene used should be of as high a degree of purity as possible. However, small amounts of other olefin hydrocarbons may be present without adversely affecting the quality of the product obtained, and in some cases copolymerization with a small amount of other olefin hydrocarbons such as styrene, decene-1, isobutylene, methyl pentadiene or 2-methyl-butadiene-1,3 may be desirable.

The products of this invention may, if desired, be completely separated from solvents by drying or distillation and thereby obtained in a relatively viscous to solid form. However, it is usually most convenient to prepare and retain them in the form of solutions in inert solvents.

The preferred products are oily solutions having the wide range of viscosities represented by the Gardner-Holdt scale, the lowest viscosity products being represented by solutions of relatively non-viscous polymers or by dilute solutions of very viscous polymers, and the highest viscosity products being represented by solutions of very viscous polymers or by concentrated solutions of relatively non-viscous polymers.

In addition to being used as the sole film forming agent in coating compositions, the products of this invention may be blended with other compatible film forming materials, such as alkyd, phenol-aldehyde, and amino-aldehyde type resins as well as with other natural or synthetic resins, vegetable oils and cellulose esters.

In addition to the pigments employed in Example 3, a wide variety of other pigments commonly used in coating compositions may be used, such as iron blues, phthalocyanine blues and greens, organic maroons and metal oxides, sulfides, sulfates, carbonates, chromates and silicates.

The coating compositions of this invention may be applied to a wide variety of substrates such as metal, wood, ceramics and textiles and may be dried by baking or by exposure to oxygen or air at atmospheric temperatures. Air drying is accelerated by incorporating into the composition conventional driers such as the metallic naphthenates and linoleates.

It is apparent that many widely different embodiments of this invention may be made without departing from the spirit and scope thereof; and therefore it is not intended to be limited except as indicated in the appended claims.

I claim:

1. The process of producing oily polymers of butadiene-1,3 which comprises (1) polymerizing butadiene-1,3 at from −20° to +20° C. in the presence of boron trifluoride etherate containing from 0.1 to 1.4 mols of water per mol of boron trifluoride etherate, and (2) increasing the viscosity of the resulting polymer by treating a solution thereof in inert solvent with boron trifluoride.

2. The process of claim 1 in which, in step (1), butadiene-1,3 is polymerized at −10° to +10° C.

3. The process of claim 1 in which, in step (1), butadiene-1,3 is polymerized in the presence of from 1% to 10%, by weight based on the butadiene-1,3, of boron trifluoride etherate containing from 0.1 to 1.4 mols of water per mol of boron trifluoride etherate.

4. The process of claim 1 in which, in step (1), butadiene-1,3 is polymerized in the presence of from 2% to 5%, by weight based on the butadiene-1,3, of boron trifluoride etherate containing from 0.1 to 1.4 mols of water per mol of boron trifluoride etherate.

5. The process of claim 1 in which, in step (1), butadiene-1,3 is polymerized in the presence of from 1% to 10%, by weight based on the butadiene-1,3, of boron trifluoride etherate containing from 0.2 to 1.0 mol of water per mol of boron trifluoride etherate.

6. The process of claim 1 in which, in step (2), the polymer solution is treated at from −20° to +100° C.

7. The process of claim 1 in which, in step (2), the polymer solution is treated at from +10° to +50° C.

8. The process of claim 1 in which, in step (2), the polymer solution contains from 20% to 80% of polymer by weight.

9. The process of claim 1 in which, in step (2), the polymer solution is treated with from 0.25% to 3% of boron trifluoride by weight based on the polymer.

10. A product of the process of claim 1.

11. A clear coating composition comprising a product of the process of claim 1 and solvent therefor.

12. A pigmented coating composition comprising a product of the process of claim 1, solvent therefor, and pigment.

References Cited in the file of this patent

UNITED STATES PATENTS

| | | |
|---|---|---|
| 2,315,080 | Reid | Mar. 30, 1943 |
| 2,318,719 | Schneider et al. | May 11, 1943 |
| 2,513,558 | Geiser | July 4, 1950 |
| 2,708,639 | Miller | May 17, 1955 |

FOREIGN PATENTS

| | | |
|---|---|---|
| 516,931 | Great Britain | Jan. 16, 1940 |